May 29, 1956 A. VISCHER, JR 2,747,832
VALVES
Filed Dec. 11, 1953
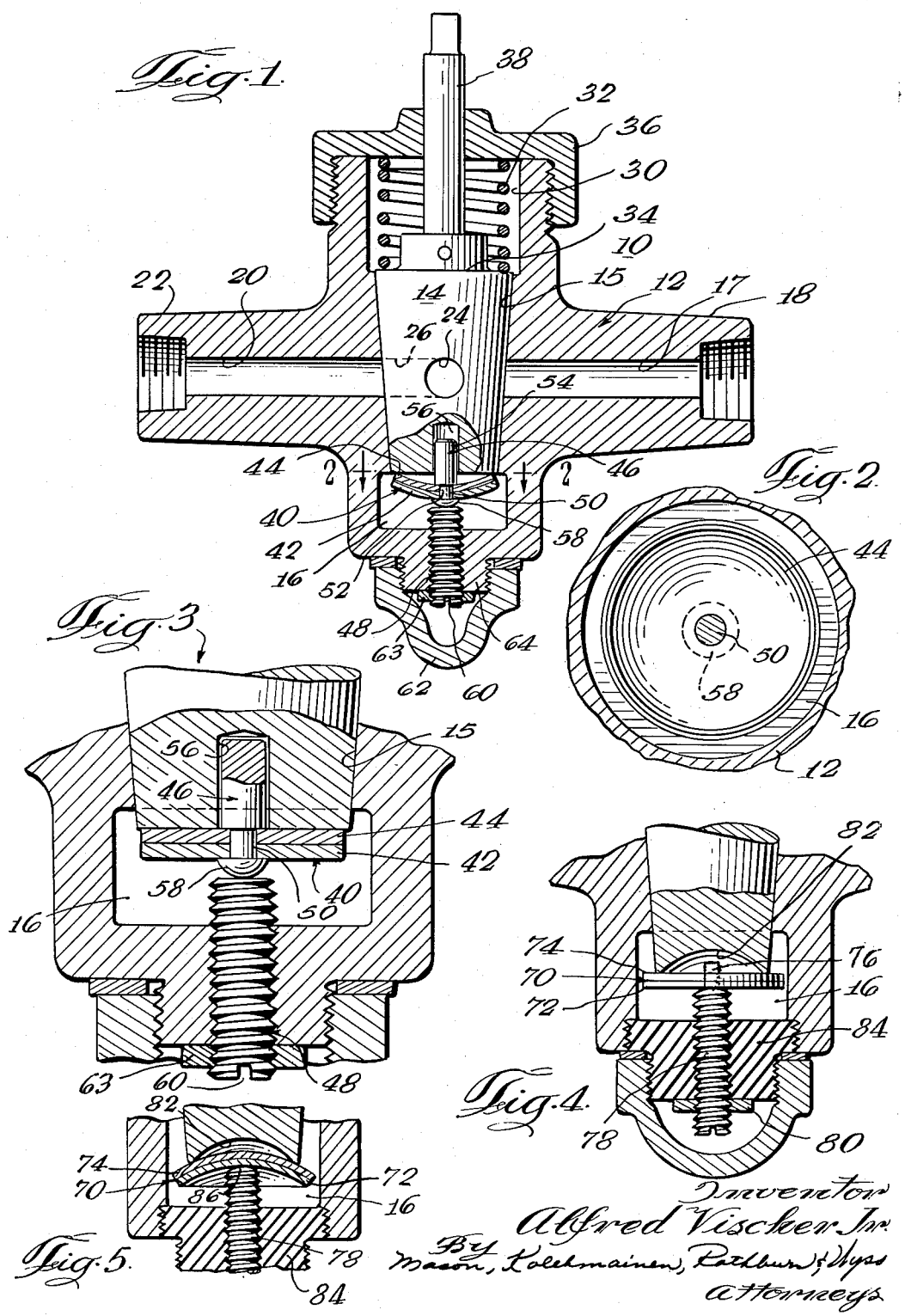
Inventor
Alfred Vischer Jr.
By Mason, Kolehmainen, Rathburn & Wyss
Attorneys

United States Patent Office 2,747,832
Patented May 29, 1956

2,747,832

VALVES

Alfred Vischer, Jr., Park Ridge, Ill., assignor of two-thirtieths to William Vischer, two-thirtieths to Alfred Vischer III, two-thirtieths to Alfred Vischer, Jr., as trustee, four-thirtieths to Walter W. Zitzewitz, four-thirtieths to Elmer K. Zitzewitz, one-thirtieth to Gertrude J. Zitzewitz, one-thirtieth to Barbara O. Zitzewitz, and two-thirtieths to Gertrude V. Bouton Application December 11, 1953, Serial No. 397,625

14 Claims. (Cl. 251—161)

The present invention has for its object the provision of a new and improved valve of the type having a tapered control element and particularly a valve of the tapered plug type which is adapted for use over a wide range of temperatures.

Prior to the present invention it has not been possible to utilize valves having tapered control elements in installations involving a considerable temperature variation. An instance of this character is in connection with sterilizers which at times are heated to rather high temperatures and then cooled. For example, if a valve made of material such as brass and having a tapered plug seated by spring means is used in installations of this character, the plug is apt to and often does freeze or get locked in a particular position upon return of the valve from a high to a low temperature. In explanation of this, it may be considered that the valve body which encircles the valve plug has a neutral axis of greater diameter than that of the neutral axis of the valve plug. When both are heated to approximately the same temperature, the outer one, i. e., the body, expands more because its neutral axis is longer. Because of this greater expansion of the valve body the plug is forced further into the plug receiving chamber by its associated seating spring. Upon subsequent cooling of the valve body, the body contracts to bind or seize the valve plug, which remains in its advanced position because of the force of the spring, with the result that the valve plug is effectively frozen in place or cannot be moved except with difficulty.

In accordance with the present invention, there is provided a valve which might be considered to be a thermostatically compensated valve avoiding the difficulty of seizing or locking of the valve plug despite the temperature variations to which the valve may be subjected. It is therefore the primary object of the present invention to provide a thermostatically compensated valve eliminating locking or seizure of the movable control element under varying temperature conditions.

A further object of the present invention is to provide a new and improved thermostatically compensated valve in which a movable control element is permitted to move axially by an opposing thermal responsive element, such as a circular disc which may be normally either flat or concave and which assumes a concave or flat position when heated and which returns to its normal position upon subsequent cooling, thereby to provide automatic means for returning the control element back to its normal position upon cooling of the valve.

A further object of the present invention is to provide a valve of the character set forth in the preceding paragraph in which the thermostatic element is constructed and arranged to provide a so called floating position for the movable control element so that the latter is maintained seated in its chamber in substantially the same way for both increasing and decreasing valve temperatures, and particularly the latter, when the control element would otherwise be seized or locked.

In brief, the valve of the present invention includes a valve body having a tapered control element receiving chamber tapering from a large diameter end toward a small diameter end, a tapered control element mounted and seated within said chamber, and spring means acting on the large end of the valve plug urging it into its seat. In addition, it includes the thermostatic compensating means providing for the axial movement of the control element in the direction of its taper as the temperature of the valve rises and for the return of the control element in the opposite direction in response to a lowering of the valve temperature. In one arrangement the control element may be a spring seated rotatable tapered plug mounted in a tapered plug receiving chamber and the thermostatic means may take the form of a circular disc. The disc may be either normally flat or normally concave with the concave side facing the end of the valve plug. The disc is located at the small end of the valve plug so as to abut against this end and to act effectively against the spring, and particularly in such manner that as the valve temperature decreases it effectively moves the valve plug toward the large end of the tapered valve receiving chamber, thereby to prevent binding and locking of the plug when the valve cools.

Other objects and advantages of the present invention will become apparent from the ensuing description of certain embodiments of the invention, in the course of which reference is had to the accompanying drawings, in which:

Fig. 1 is an enlarged axial cross sectional view of a plug valve constructed in accordance with the invention and in an unheated condition;

Fig. 2 is an enlarged fragmentary transverse cross sectional view taken along the line 2—2 of Fig. 1;

Fig. 3 is a fragmentary enlarged axial cross sectional view showing the valve when heated to a high temperature; and Figs. 4 and 5 are fragmentary enlarged axial cross sectional views showing other embodiments of the invention in its normal and heated conditions.

Referring now to the drawings and first to Figs. 1 to 3 it may be noted that the present invention is shown embodied in a valve of the rotatable plug type and indicated as a whole by reference character 10. It includes a valve body 12 and a movable tapered control element such as the valve plug 14, both of which may be made of suitable material, such as brass. The valve body is provided with a tapered control element receiving chamber 15 tapering from a large end toward a small end for the reception, in this case, of the plug 14. A chamber 16 is located at the smaller end of chamber 15. The valve illustrated is of the three way type including a first passageway 17 formed in a boss 18, a second passageway 20 formed in an oppositely located boss 22, which passageways are located, for example, diametrically opposite to each other. The valve body is also provided with a third passageway located substantially equi-distantly between these two passageways but which is not shown in the drawing. The valve may, however, have other arrangements of passageways.

The illustrated control element, i. e., the plug 14, is of the conventional tapered type and has the generally right angularly disposed interconnected passageways 24 and 26 adapted selectively to be moved into different flow control positions when the plug is turned.

The large end of the plug receiving chamber is counterbored to provide a chamber 30 for the conventional plug biasing or seating spring 32. One end of the spring abuts against the large end 34 of the plug while the other end abuts against the inner surface of a closure cap 36 through which the plug operating stem 38 extends to the exterior of the valve. A conventional operating handle (not shown) may be secured to the stem.

When a valve having a tapered control element and tapered seat, such as a plug valve of the character described, is used in relatively fixed or constant temperature installations, it operates satisfactorily. The reason for this is that the valve body and control element are maintained in substantially the same positional relationship with substantially the same spring pressure applied thereto. Consequently, the valve element may be moved between its various operating positions without difficulty.

However, when a valve of this character is utilized in installations where the temperature may vary considerably, then upon subsequent cooling from a higher temperature the movable element may be frozen or locked so that it is impossible at times to move it. The reason for this in a valve of the type illustrated is that the valve body, which is located around and encircles the valve plug, has a larger diameter neutral axis. As a result, when the valve is heated as by the flow of high temperature fluids through it or by reason of a rise in temperature of the environment in which the valve is located, then the valve body expands a greater amount than the valve plug which has a smaller diameter neutral axis. As a result of this the spring 32 forces the valve plug toward the small diameter end of the plug receiving chamber. Then upon subsequent cooling, the body with its larger diameter neutral axis contracts more and seizes the valve plug, which is maintained at its so called advanced position by self locking taper of the plug and chamber as well as by the seating spring.

In accordance with the present invention, the likelihood of the control element being locked or seized in the valve body is substantially eliminated through novel thermostatic means acting upon the element. In the illustrated embodiment the thermostatic means provides what might be considered a floating seating for the valve plug, the position of which is varied in response to temperature variations of the valve. Referring again to the drawings, the thermostatic means acting upon the plug 14 has been illustrated as a circular bimetallic disc 40 located in recess 16 and cooperatively associated with the small end of the valve plug to move away from the normal position in which it is illustrated in Fig. 1 to the elevated temperature position of Fig. 3 when the temperature rises and to return to the position of Fig. 1 when the temperature falls. In going from the low to the high temperature position, the thermostatic element or, in this case, its peripheral portion, moves away from the tapered plug receiving chamber thereby to enable the spring properly to maintain the valve plug in desired seating relationship in the valve chamber. Upon cooling, the thermostatic element forces the plug back toward its normal position against the force of the spring. The arrangement is such that the thermostatic element permits the desired movement of the valve plug in correspondence to the greater expansion of the valve body so that the plug is maintained in substantially the same seating or floating relationship in the valve body over the temperature range of operation of the valve.

In the embodiment of Figs. 1 to 3 the disc 40 is normally concave and flattens out in response to a temperature increase. The disc has a first part 42 made of metal having a lower temperature coefficient of expansion than the second part 44. The disc is also normally concave with the outer peripheral portion of the concave side abutting the small end of the valve plug, the arrangement thus being such that there is substantially line contact around the small end of the plug.

The disc is held in desired and adjusted position relative to the small end of the plug by a supporting pin 46 and an adjusting screw 48. The pin 46 has a reduced neck portion 50 extending through a centrally located aperture 52 in the disc. The pin includes also a larger diameter end portion 54 slidably received within an axial opening 56 in the small end of the valve plug. The pin has also a larger and rounded head 58 at the outside of the disc 40 and which abuts against the adjusting screw 48. The latter is provided with a screwdriver slot 60 at its outer end which is made accessible upon the removal of a protective end cap 62 suitably mounted as upon the externally threaded extension 64 of the valve body. The screw 48 may be locked in position by lock nut 63.

As heretofore indicated, the disc 40 normally occupies a concavo-convex position with the concave side facing toward the small end of and abutting against that end of the valve plug. The adjusting screw 48 is so adjusted that the disc bears against the small end of the plug with desired force and so that the spring maintains the valve plug in adequate seating relationship in its chamber over the range of temperature variations. At low temperatures, which may be considered normal in the illustrated case, the disc remains in its indicated position, but when the valve is subjected to a higher temperature, the disc gradually moves from the position of Fig. 1 toward the position, for example, of Fig. 3 where it has been indicated as being substantially flatter. This position indicates the maximum movement of the disc in response to the raising of the valve to a temperature at the high limit of its intended temperature range. When the valve temperature decreases back to its normal value the disc returns to its concavo-convex condition as illustrated in Fig. 1. The disc is so constructed, proportioned and arranged and the adjustment by the screw 48 effected so that the disc moves gradually in the direction of the taper to enable the spring to maintain a reasonable fixed valve plug seating pressure in response to the unequal change in dimensions of the body resulting from temperature changes in it. Upon cooling, the return of the disc to its normal position in effect pushes the plug back toward its normal position, the movement occurring at a rate sufficient to prevent the plug from being locked, but at the same time being slow enough so that the plug is maintained in its desired seating relationship in the valve body.

The thermostatic means for providing the desired compensation, so to speak, of the valve may take various forms. Other forms are illustrated in Figs. 4 and 5 showing low and high temperature positions of two different constructions. In Fig. 4 the thermostatic disc, indicated by the reference character 70 and having the low and high temperature coefficient metals 72 and 74, respectively, is mounted relatively loosely at the end of a pin like centering projection 76 formed on the adjusting screw 78 having a lock nut 80 associated therewith. The disc is normally substantially flat and assumes a concavo-convex shape when heated, much as shown in Fig. 5, with the convex side facing the plug. The screw is mounted in a threaded closure member 84 closing recess 16. The closure member is secured in place after the disc is placed in the recess through the opening closed by the closure member. The small end of the plug is provided with a concave depression or recess 82 for receiving the disc in its high temperature condition thereby to permit movement of the valve plug by its associated spring. The operation of this embodiment is like that previously described so that further amplification is not deemed necessary.

The modification of Fig. 5 is similar to that of Fig. 4. In it the centering pin 76 is omitted and centering being effected by making the disc imperforate and larger so as to be only slightly smaller than the chamber. In this case the adjusting screw terminates in a rounded end 86 abutting against the center of the disc. The operation of this embodiment is also like that previously described.

While the present invention has been described in connection with the details of different embodiments thereof, it is to be understood that these details are not intended to be limitative of the invention except in so far as set forth in the accompanying claims.

Having thus described my invention, what I desire to secure by United States Letters Patent is:

1. A valve comprising a valve body with a tapered control element receiving chamber provided with a valve seat, a tapered control element mounted in said chamber, spring means acting axially on said element for maintaining it seated in said chamber, and thermal responsive means movable axially of the control element in response to variations in the temperature of said valve and operatively connected to said element for opposing movement of said element by said spring means.

2. A thermostatically compensated valve, including in combination, a valve body having a control element receiving chamber having a seat tapering in one direction from a large end toward a small end, a tapered control element in said chamber, spring means acting on said element urging it to seat in said chamber, and a thermostatic element acting on said control element in opposition to said spring and movable axially of said element and chamber in said one direction as the valve temperature is decreased to prevent locking of the plug.

3. A thermostatically compensated valve, including in combination, a valve body having a control element receiving chamber having a seat tapering in one direction from a large end toward a small end, a tapered control element in said chamber, spring means acting on the large end of said element urging it to seat in said chamber, and thermostatic means abutting against the small end of said control element and arranged to move axially of the element in said one direction approximately the same amount as the element in response to heating of the valve and to move the element in the opposite direction in response to cooling of the valve.

4. A thermostatically compensated valve, including in combination, a valve body having a plug receiving chamber tapering in one direction from a large end toward a small end, a tapered valve control element in said chamber, spring means acting on the large end of said element urging it to seat in said chamber, thermostatic means abutting against the small end of said element and arranged to move axially of the element in said one direction approximately the same amount as the element in response to heating of the valve and to move the element in the opposite direction in response to cooling of the valve, and means accessible from the exterior of the valve body for adjusting said thermostatic means axially of the element to vary its position relative to said element.

5. A valve comprising a valve body with a plug receiving chamber tapering in one direction from a larger end toward a smaller end, a tapered control element mounted in said chamber, spring means acting on said element to seat it in said chamber, thermal responsive means movable axially of the element in response to variations in the temperature of said valve and operatively connected to said element for opposing movement of said element by said spring means, and means operatively connected to said thermal responsive means for adjusting it relative to said element to vary its effective opposition to said spring means.

6. A thermostatically compensated valve, including in its combination, a valve body having a tapered control element receiving chamber tapering in one direction from a large opening at one end to a smaller opening at the other end, a tapered control element and spring means acting on the large end of said tapered control element urging it to seat in said chamber, and temperature responsive means opposing said spring action on cooling to prevent said control element from binding in chamber.

7. A thermostatically compensated valve, including in combination, a valve body having a tapered plug receiving chamber tapering in one direction from a large diameter end toward a small diameter end, a tapered valve plug seated in said chamber and rotatably movable therein into different flow controlling positions, spring means acting on the large end of said plug urging it to seat in said chamber, and a circular bimetallic temperature responsive disc abutting against the small end of said plug and arranged to move axially of the plug in said one direction approximately the same amount as the plug in response to heating of the valve and to move the plug in the opposite direction in response to cooling of the valve.

8. A thermostatically compensated valve, including in combintaion, a valve body having a tapered plug receiving chamber tapering in one direction from a large diameter end toward a small diameter end, a tapered valve plug seated in said chamber and rotatably movable therein into different flow controlling positions, spring means acting on the large end of said plug urging it to seat in said chamber, and means including a circular centrally apertured bimetallic disc and supporting means extending through said aperture for supporting said disc in abutting relation against the small end of said plug for movement axially of the plug in said one direction in response to heating of the valve and in the opposite direction in response to cooling of the valve.

9. A thermostatically compensated valve, including in combination, a valve body having a tapered plug receiving chamber tapering in one direction from a large diameter end toward a small diameter end, a tapered valve plug seated in said chamber and rotatably movable therein into different flow controlling positions, spring means acting on the large end of said plug urging it to seat in said chamber, means including a circular centrally apertured bimetallic disc and supporting means extending through said aperture slidably received in said plug for supporting said disc in abutting relation against the small end of said plug for movement axially of the plug in said one direction in response to heating of the valve and in the opposite direction in response to cooling of the valve, and means for adjusting the position of said supporting means axially of said plug.

10. A thermostatically compensated valve, including in combination, a valve body having a tapered plug receiving chamber tapering in one direction from a large diameter end toward a small diameter end, a tapered valve plug seated in said chamber and rotatably movable therein into different flow controlling positions, spring means acting on the large end of said plug urging it to seat in said chamber, an axial opening in the smaller end of said plug, and means including a circular centrally apertured bimetallic disc and supporting means extending through said aperture into said opening for supporting said disc in abutting relation against the small end of said plug for movement axially of the plug in said one direction in response to heating of the valve and in the opposite direction in response to cooling of the valve, and means adjustably mounting said supporting means on said body for movement axially of said plug.

11. A thermostatically compensated valve, including in combination, a valve body having a tapered plug receiving chamber tapering in one direction from a large diameter end to a small diameter end, a tapered valve plug seated in said chamber and rotatably movable therein into different flow controlling positions, spring means acting on the large end of said plug urging it to seat in said chamber, said plug having a concave depression at its small diameter end, and a normally substantially flat bimetallic disc abutting against the small end of said plug and arranged to assume a concavo-convex position with its convex side extending into said depression in response to a temperature increase.

12. A thermostatically compensated valve, including in combination, a valve body having a tapered plug receiving chamber tapering in one direction from a large diameter end to a small diameter end, a tapered valve plug seated in said chamber and rotatably movable therein into different flow controlling positions, spring means acting on the large end of said plug urging it to seat in said chamber, said plug having a concave depression at its small diameter end, a normally substantially flat bimetallic disc abutting against the small end of said plug and arranged to assume a concavo-convex position with its convex side extending into said depression in response to a temperature increase, and means mounting said disc on said body for adjustment axially of said plug.

13. A thermostatically compensated valve, including in combination, a valve body having a tapered plug receiving chamber tapering in one direction from a large diameter end to a small diameter end, a tapered valve plug seated in said chamber and rotatably movable therein into different flow controlling positions, spring means acting on the large end of said plug urging it to seat in said chamber, said plug having a concave depression at its small diameter end, a normally substantially flat bimetallic disc abutting against the small end of said plug and arranged to assume a concavo-convex position with its convex side extending into said depression in response to a temperature increase, said disc being substantially centrally apertured and means including a pin projecting through said disc for mounting it on said body for adjustment axially of said plug.

14. A thermostatically compensated valve, including in combination, a valve body having a tapered plug receiving chamber tapering in one direction from a large diameter end to a small diameter end, an enlarged recess at the small end of said chamber, a tapered valve plug seated in said chamber and rotatably movable therein into different flow controlling positions, spring means acting on the large end of said plug urging it to seat in said chamber, the small diameter end of said plug extending into said recess and said plug having a concave depression at its small diameter end, a normally flat imperforate bimetallic disc abutting against the small end of said plug and arranged to assume a concavo-convex position with its convex side extending into said depression in response to a temperature increase, said disc being but slightly smaller in size than said recess, and means engaging said disc at substantially its center for holding said disc in said recess in abutting relation to said plug.

References Cited in the file of this patent

UNITED STATES PATENTS

| | | |
|---|---|---|
| 1,338,190 | Nelson | Apr. 27, 1920 |
| 2,097,585 | Carson | Nov. 2, 1937 |
| 2,274,145 | Johnson | Feb. 24, 1942 |
| 2,327,336 | Bolesky | Aug. 24, 1943 |
| 2,353,464 | Hayter | July 11, 1944 |
| 2,647,017 | Coulliette | July 28, 1953 |